(12) United States Patent
Teil

(10) Patent No.: US 9,915,572 B2
(45) Date of Patent: Mar. 13, 2018

(54) FORCE SENSING COMPLIANT ENCLOSURE

(71) Applicant: Apple Inc., Cupertino, CA (US)

(72) Inventor: Romain A. Teil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/025,276

(22) PCT Filed: Sep. 29, 2013

(86) PCT No.: PCT/US2013/062510
§ 371 (c)(1),
(2) Date: Mar. 27, 2016

(87) PCT Pub. No.: WO2015/047360
PCT Pub. Date: Apr. 2, 2015

(65) Prior Publication Data
US 2016/0216164 A1     Jul. 28, 2016

(51) Int. Cl.
*G01L 1/14*     (2006.01)
*G06F 1/16*     (2006.01)
(Continued)

(52) U.S. Cl.
CPC ............... *G01L 1/146* (2013.01); *G01L 1/16* (2013.01); *G06F 1/1626* (2013.01);
(Continued)

(58) Field of Classification Search
CPC . G01L 1/14; G06F 1/1656; G06F 2200/1636; G01F 3/044; H03K 17/9629
See application file for complete search history.

(56) References Cited

U.S. PATENT DOCUMENTS 4,094,192 A * 6/1978 Watson .................. G01L 5/161
338/2
4,493,220 A * 1/1985 Carignan ............. A61B 5/1036
73/862.628
(Continued)

FOREIGN PATENT DOCUMENTS

| DE | 102005016282 | 10/2006 |
|---|---|---|
| EP | 2315186 | 4/2011 |
| EP | 2508960 | 10/2012 |

OTHER PUBLICATIONS

International Search Report and Written Opinion dated Apr. 30, 2014, PCT/US2013/062510, 13 pages.
(Continued)

*Primary Examiner* — Lisa Caputo
*Assistant Examiner* — Tran M Tran
(74) *Attorney, Agent, or Firm* — Brownstein Hyatt Farber Schreck, LLP

(57) ABSTRACT

A force sensing compliant enclosure for an electronic device may include at least one deformable housing wall. At least one strain concentration portion may be located on the deformable housing wall where strain caused by application of a force that deforms the deformable housing wall is greater than at other portions of the deformable housing wall. The strain concentrating portion may have a second thickness that is thinner than other portions of the deformable housing wall. One or more sensors may be positioned in the strain concentration portion and may sense strain caused by the application of the force that deforms the deformable housing wall.

20 Claims, 8 Drawing Sheets

(51) Int. Cl.
*G01L 1/16* (2006.01)
*H04B 1/3888* (2015.01)

(52) U.S. Cl.
CPC ......... *G06F 1/1656* (2013.01); *H04B 1/3888* (2013.01); *G06F 2200/1636* (2013.01)

(56) References Cited

U.S. PATENT DOCUMENTS

| | | | | |
|---|---|---|---|---|
| 4,539,554 A * | 9/1985 | Jarvis | ................ | H03K 17/9643 310/311 |
| 4,553,124 A * | 11/1985 | Malicki | ................ | F16B 31/025 338/2 |
| 4,785,673 A * | 11/1988 | Aumard | ................ | G01L 1/2243 177/211 |
| 4,932,253 A * | 6/1990 | McCoy | ............... | E21B 47/0006 73/152.61 |
| 5,447,074 A * | 9/1995 | Polaert | .................. | G01L 1/2206 73/763 |
| 5,922,967 A * | 7/1999 | Motoyama | ............... | G01B 7/18 73/772 |
| 6,002,389 A * | 12/1999 | Kasser | .................... | G06F 3/041 178/18.01 |
| 6,354,155 B1 * | 3/2002 | Berme | .................... | G01L 5/161 73/862.043 |
| 6,723,937 B2 * | 4/2004 | Englemann | ............ | H03K 17/96 200/600 |
| 6,792,815 B2 * | 9/2004 | McDearmon | ........... | G01L 5/161 73/862.041 |
| 7,006,078 B2 * | 2/2006 | Kim | .................... | G06K 9/0002 178/18.06 |
| 7,154,481 B2 * | 12/2006 | Cross | .................... | G06F 3/0412 178/18.01 |
| 7,219,561 B2 * | 5/2007 | Okada | .................... | G01L 5/165 73/862.043 |
| 7,324,007 B2 * | 1/2008 | Sunderman | ........... | E21F 17/185 340/539.1 |
| 7,364,020 B2 * | 4/2008 | Ante | ..................... | B60T 17/221 188/1.11 E |
| 7,375,645 B2 * | 5/2008 | Tsai | ...................... | G01L 5/0052 340/665 |
| 7,536,924 B2 * | 5/2009 | Schmitz | ............. | B23Q 17/0971 73/1.08 |
| 7,595,788 B2 * | 9/2009 | Son | ......................... | G06F 3/044 341/22 |
| 7,825,907 B2 * | 11/2010 | Choo | .................... | G06F 3/0202 345/156 |
| 7,836,774 B2 * | 11/2010 | Ogawa | ................... | B60N 2/002 73/761 |
| 7,903,090 B2 * | 3/2011 | Soss | ...................... | G06F 3/0414 345/173 |
| 8,521,448 B1 * | 8/2013 | Ung | ...................... | B64F 5/0045 702/42 |
| 8,596,135 B2 * | 12/2013 | Karp | ................... | G01M 5/0033 702/34 |
| 8,695,432 B2 * | 4/2014 | Hsieh | .................... | F16B 31/025 411/383 |
| 8,978,967 B2 * | 3/2015 | Gamboa | ............ | G05B 19/4183 235/375 |
| 9,069,404 B2 * | 6/2015 | Hotelling | .............. | G06F 3/0414 |
| 9,069,426 B2 * | 6/2015 | Pance | ..................... | G06F 3/044 |
| 9,329,685 B1 * | 5/2016 | Puskarich | ........... | H03K 17/975 |
| 9,395,256 B2 * | 7/2016 | Carignan | ............. | G01L 5/161 |
| 9,404,817 B2 * | 8/2016 | Steier | ................... | A43B 3/0005 |
| 9,429,485 B1 * | 8/2016 | Cavallaro | ................ | G01L 1/04 |
| 9,490,804 B2 * | 11/2016 | Hanumanthaiah | ... | H03K 17/962 |
| 2009/0002199 A1 * | 1/2009 | Lainonen | ............. | H03K 17/964 341/20 |
| 2011/0037624 A1 | 2/2011 | Pance et al. | | |
| 2012/0088553 A1 | 4/2012 | Nunes | | |
| 2017/0191882 A1 * | 7/2017 | Okada | ...................... | G01L 1/04 |

OTHER PUBLICATIONS

Second Written Opinion dated Sep. 11, 2015, PCT/US2013/062510, 10 pages.

International Preliminary Report on Patentability dated Dec. 9, 2015, PCT/US2013/062510, 11 pages.

* cited by examiner

FORCE SENSING COMPLIANT ENCLOSURE

CROSS REFERENCE TO RELATED APPLICATION

This application is a 35 U.S.C. § 371 application of PCT/US2013/062510, filed on Sep. 29, 2013, and entitled "Force Sensing Compliant Enclosure," which is incorporated by reference as if fully disclosed herein.

TECHNICAL FIELD

This disclosure relates generally to electronic device enclosures, and more specifically to a force sensing compliant enclosure for an electronic device.

BACKGROUND

Electronic devices receive input from users via a variety of different mechanisms. Such mechanisms include buttons, keys, external input devices (such as computer mice, scanners, and so on), touch screens, and other such input mechanisms. However, providing such input mechanisms as part of an electronic device requires space on the electronic device. Additionally, such input mechanisms may complicate the electronic device and/or the aesthetic appearance of the electronic device. External input devices may not require space on the electronic device itself. However, they may still require a connector of some kind to be located on the electronic device and may be cumbersome for users to utilize, particularly in the case of portable and/or handheld electronic devices.

Some electronic devices may be configured to utilize the housing or enclosure of the electronic device itself as an input mechanism. However, due to the techniques and mechanisms utilized to detect input via the housing/enclosure, many such electronic device may be limited as to the kind and/or amount of input that can be recognized via such input mechanisms.

SUMMARY

The present disclosure discloses apparatuses and methods for force sensing compliant enclosures for electronic devices. A force sensing compliant enclosure for an electronic device may include at least one deformable housing wall. At least one strain concentration portion may be located on the deformable housing wall where strain caused by application of a force that deforms the deformable housing wall is greater than at other portions of the deformable housing wall. The strain concentrating portion may have a second thickness that is thinner than other portions of the deformable housing wall. One or more sensors may be positioned in the strain concentration portion and may sense strain caused by the application of the force that deforms the deformable housing wall. In this way, the strain caused by the deformation of the deformable housing wall may be concentrated at the location sensed by the sensor.

In some implementations, the force sensing compliant enclosure may include multiple strain concentrating portions that may form pockets or notches in one or more deformable housing walls of the force sensing compliant enclosure that may each include one or more sensors. However, in other implementations the strain concentrating portion may comprise a groove that runs along an inner surface of one or more deformable housing walls, such as across an internal perimeter of the force sensing compliant enclosure.

The electronic device may include one or more processing units that receive and interpret data regarding the strain sensed by the sensor to determine one or more user inputs that correspond to the force applied to the deformable housing wall. In some cases the processing unit may analyze the data to determine an amount of the applied force and/or a location on the force compliant enclosure and/or electronic device where the force was applied. In various cases, the processing unit may determine the location where the force was applied and compare the determined location to a previously determined location where a previous force was applied to determine a movement between the two locations.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
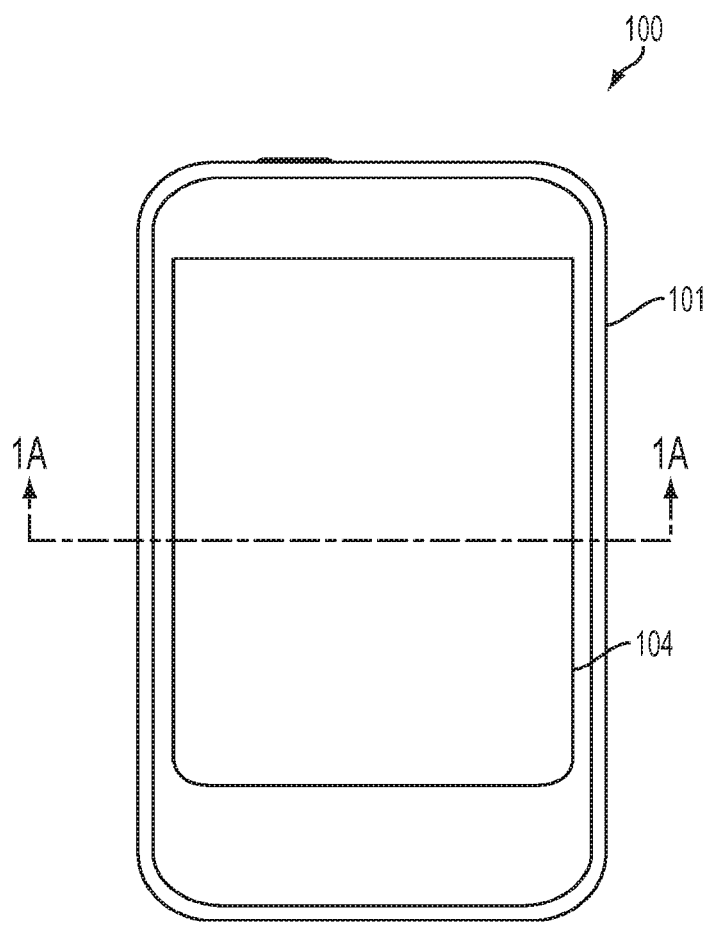
FIG. 1A is a top view of an electronic device.

The description that follows includes sample systems, methods, and computer program products that embody various elements of the present disclosure. However, it should be understood that the described disclosure may be practiced in a variety of forms in addition to those described herein.

The present disclosure discloses apparatuses and methods for force sensing compliant enclosures for electronic devices. A force sensing compliant enclosure for an electronic device may include at least one deformable housing wall. At least one strain concentration portion may be located on the deformable housing wall where strain caused by application of a force that deforms the deformable housing wall is greater than at other portions of the deformable housing wall. One or more sensors may be positioned in the strain concentration portion and may sense strain caused by the application of the force that deforms the deformable housing wall. In this way, the strain caused by the deformation of the deformable housing wall may be concentrated at the location sensed by the sensor.

In various implementations, the deformable housing wall where the strain concentrating portion may have a first thickness and the strain concentrating portion may have a second thickness that is thinner than the first thickness. In this way, the strain caused by the deformation of the deformable housing wall may be further concentrated at the strain concentration point.

Further, the deformable housing wall may be composed of a first material at portions other than strain concentration portion and a second material at the strain concentration portion. In some cases, such a first portion may be less deformable than the second material, such as where the first portion is a rigid material such as metal or hard plastic and the second portion is a soft material such as an elastomer or other material that is softer than the first material, in order to further maximize the strain at the strain concentrating portion. Alternatively, the second material may be more rigid than the first material in order to strengthen thinner strain concentrating portions and/or prevent stress fatigue.

In some implementations, the force sensing compliant enclosure may include multiple strain concentrating portions that may form pockets or notches in one or more deformable housing walls of the force sensing compliant enclosure that may each include one or more sensors. However, in other implementations the strain concentrating portion may comprise a groove that runs along an inner surface of one or more deformable housing walls, such as across an internal perimeter of the force sensing compliant enclosure.

In one or more implementations, the strain at some portions of the strain concentration portion may be greater than at other portions. In such cases, the sensor may be positioned at the portions where the strain is greater. Additionally, the strain may occur aligned in a particular direction with respect to the strain concentration portions. In such cases, the sensor may be aligned with the direction in order to maximize the strain sensed by the sensor.

The electronic device may include one or more processing units that receive and interpret data regarding the strain sensed by the sensor to determine one or more user inputs that correspond to the force applied to the deformable housing wall. In some cases the processing unit may analyze the data to determine an amount of the applied force and/or a location on the force compliant enclosure and/or electronic device where the force was applied. In various cases, the processing unit may determine the location where the force was applied and compare the determined location to a previously determined location where a previous force was applied to determine a movement between the two locations (such as where a user pressed and dragged a finger across a surface of the force compliant enclosure and/or electronic device).

In some implementations, the strain concentrating portion may include structures such as springs or other mechanisms that may operate to assist in return at least a portion of the deformable housing wall to an un-deformed state after the force is no longer applied. In some cases, such structures may be portions of the sensor.

In various implementations, the sensor may be any kind of sensor that is operable to sense the strain. Such as sensor may include, but is not limited to, at least one strain gauge, at least one capacitive sensor, at least one parallel plate capacitive sensor, or at least one piezoelectric sensor.

In one or more implementations, a method for operating an electronic device may include: deforming at least one deformable housing wall of a force sensing compliant enclosure in response to application of a force; determining a strain caused by the deformation utilizing at least one sensor positioned on at least one strain concentration portion of the at least one deformable housing wall wherein the strain is greater at the at least one strain concentration portion than at other portions of the at least one deformable housing wall; receiving data regarding the strain determined by the at least one sensor utilizing at least one processing unit; and determining at least one user input, utilizing the at least one processing unit, based at least on the received data.

FIG. 1A is a top view of an electronic device 100. As illustrated, the electronic device is a smart phone with a housing 101 made of a deformable material (such as metal, plastic, elastomer, and/or any other material that is capable of deformation) and a display screen 104. However, it is understood that this is an example. In other implementations, the electronic device may be any electronic device such as a tablet computer, a smart phone, a cellular telephone, a handheld electronic device, a laptop computer, a desktop computer, a mobile computer, a portable electronic device, a digital music player, a digital video player, a remote control device, and/or any other electronic device.

Figure 1B:
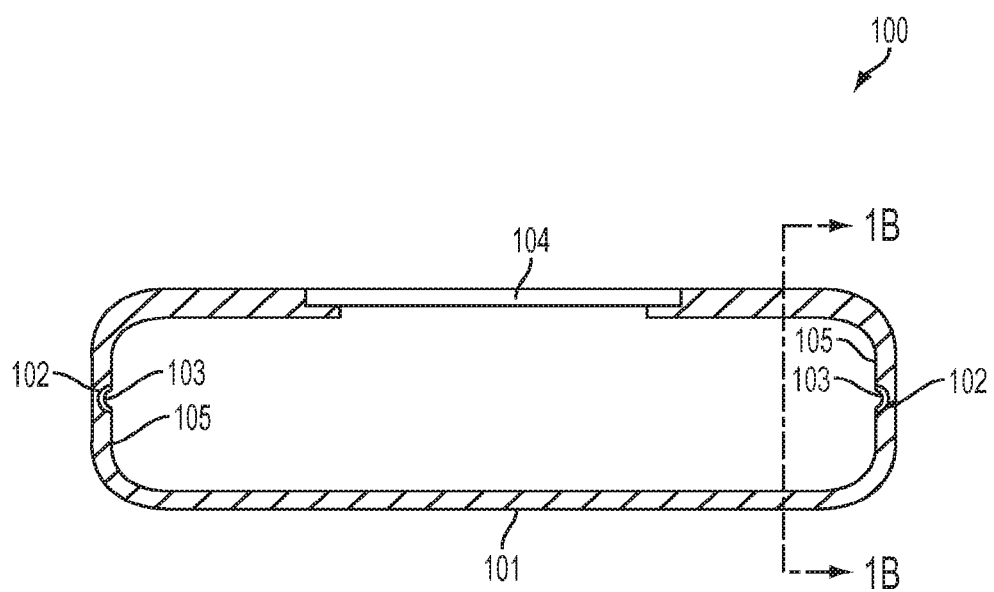
FIG. 1B is a cross-sectional front side view of a first implementation of the electronic device of FIG. 1A taken along the line 1A-1A of FIG. 1A.

FIG. 1B is a cross-sectional front side view of a first implementation of the electronic device 100 taken along the line 1A-1A of FIG. 1A. As illustrated, the housing 101 includes internal wall surfaces 105 with strain concentration portions 102 located thereon. As further illustrated, the strain concentration portions are notches, pockets, grooves, or indents that have a thickness that is less than other portions of the housing. As such, due to the thinner nature of the strain concentration portions, a force applied to the housing causes a maximum amount of strain at the strain concentration points. Additionally, sensors 103 are positioned in the strain concentration portions. Thus, as the sensors are positioned where the maximum amount of strain occurs when the housing is deformed, the sensors are able to sense the maximum amount of strain experienced by the housing when the housing is deformed.

The sensors 103 may be any kind of sensors operable to sense the strain such as one or more one strain gauges, one or more capacitive sensors, one or more parallel plate capacitive sensors, one or more at least one piezoelectric sensors, and/or any other kind of sensor. For example, the sensor may be a strain gauge positioned at the thinnest portion of the strain concentration portion 102. In another example, the sensor may be a parallel plate capacitive sensor with each of the parallel plates positioned on an opposing side of the strain concentration portion. In such an example, the notch of the strain concentration portion may be configured to be narrow enough that the displacement of the parallel plates with respect to each other caused by the deformation of the housing 101 is enough to be capacitive sensed. In still another example, the sensor may be a flex circuit positioned on one side of the strain concentration portion that detects displacement of the other side of the strain concentration portion caused by the deformation of the housing.

In some cases, one or more portions of the strain concentrating portion 102 may experience greater strain when the housing 101 is deformed than other portions. For example, in some cases, the thinnest portion of the strain concentration portion (the middle as illustrated) may experience greater strain when the housing is deformed than other portions. In such cases, the sensor 103 may be positioned in the strain concentrating portion at the location where the strain is the greatest. Such portions of greatest strain and/or sensor placement may be determined for the housing utilizing finite element analysis.

Further, the strain may be experienced by the strain concentrating portion 102 in a particular direction and the sensor 103 may be aligned with that direction in order to maximize the strain sensed by the sensor. For example, the strain experienced by the strain concentrating portion may not be exerted on the strain concentrating portion in a purely vertical direction. As such, the greatest strain may not be experienced precisely at the thinnest portion of the strain concentrating portion as illustrated. Instead, the strain may be exerted on the strain concentrating portion at an angle, causing the maximum strain to be experienced on a portion of one side of the strain concentrating portion. In such a case, the sensor may be positioned and aligned on the side of the strain concentrating portion accordingly. Such strain direction and/or sensor placement and alignment may be determined for the housing utilizing finite element analysis.

As illustrated, the electronic device 100 includes multiple strain concentrating portions 102 and multiple sensors 103. However, it is understood that this is an example. In various implementations, the electronic device may include any number of strain concentrating portions and/or sensors, such as one or a hundred, without departing from the scope of the present disclosure.

Figure 1C:
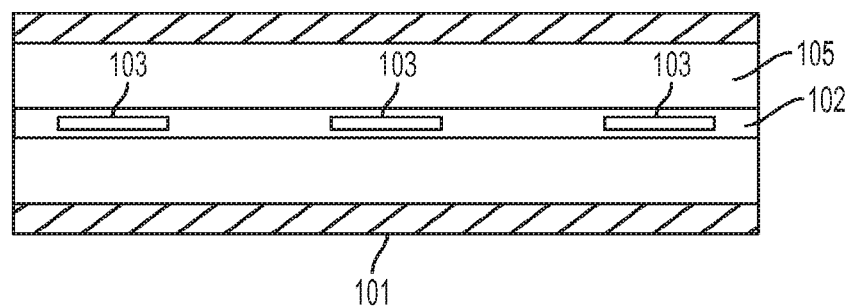
FIG. 1C is a cross-sectional left side view of a first embodiment of the electronic device of FIG. 1B taken along the line 1B-1B of FIG. 1B.

FIG. 1C is a cross-sectional left side view of a first embodiment of the electronic device of FIG. 1B taken along the line 1B-1B of FIG. 1B. As illustrated, in this embodiment, the strain concentrating portion 102 may be a groove which includes multiple sensors 103 and that runs the length of the internal wall surfaces 105. Further, although only a portion of the internal wall surface is illustrated, in some cases the groove may run across the internal wall surfaces of the housing 101, which may include where the various internal walls of the housing join, and may thus run across an internal perimeter of the housing 101.

Figure 1D:
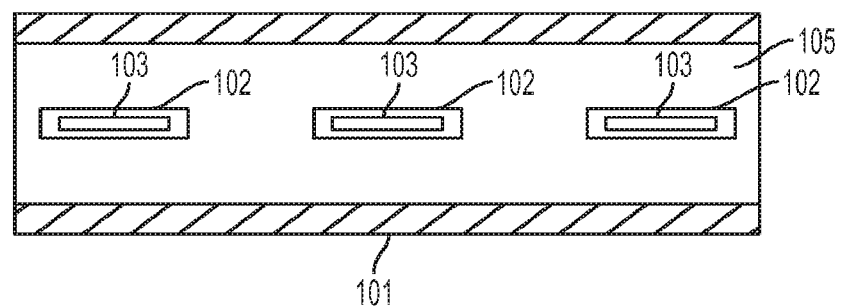
FIG. 1D is a cross-sectional left side view of a first embodiment of the electronic device of FIG. 1B taken along the line 1B-1B of FIG. 1B.

FIG. 1D is a cross-sectional left side view of a first embodiment of the electronic device of FIG. 1B taken along the line 1B-1B of FIG. 1B. As illustrated, in this embodiment, the strain concentrating portion 102 may be a pocket and/or a series of pockets positioned on the internal wall surface 105. Such a pocket implementation may not concentrate as much strain on the strain concentration portions as the groove implementation discussed above with respect to FIG. 1C. However, the pocket implementation may provide additional strength over the groove implementation.

As illustrated, each pocket only includes a single sensor. However, it is understood that this is an example and that in various implementations multiple sensors may be positioned in each pocket.

Figure 1E:
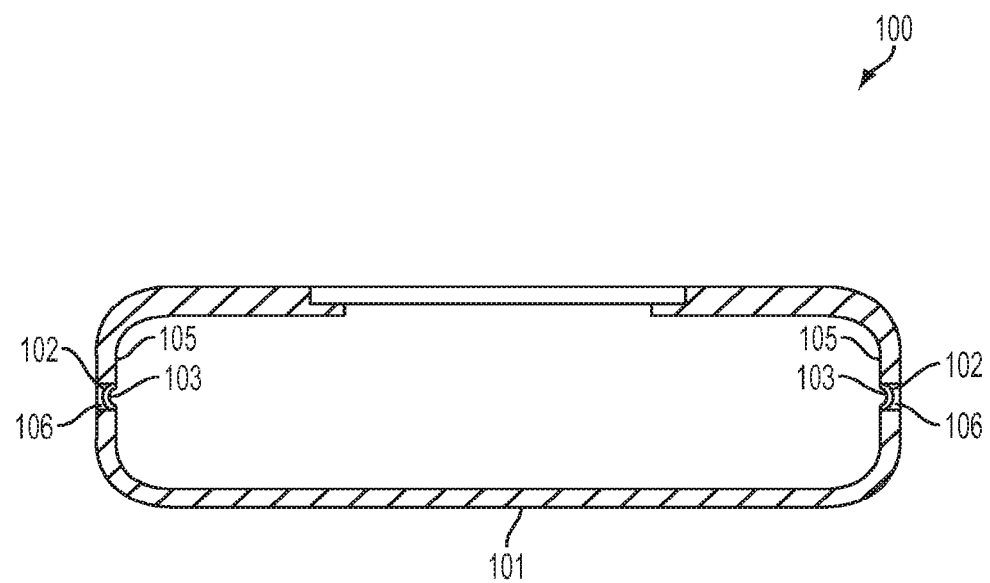
FIG. 1E is a cross-sectional front side view of a second implementation of the electronic device of FIG. 1A taken along the line 1A-1A of FIG. 1A.

FIG. 1E is a cross-sectional front side view of a second implementation of the electronic device of FIG. 1A taken along the line 1A-1A of FIG. 1A. As illustrated, the portions of the housing 101 located at the strain concentrating portions 102 may comprise a different material 106 than the other portions of the housing.

In some cases, this different material 106 may be a more deformable material than the other portions of the housing in order to further maximize strain on the strain concentrating portion. In one example of such a case, the different material may be an elastomer and the other portions of the housing 101 may be a hard plastic. In another example of such a case, the different material may be a plastic and the other portions of the housing may be a metal.

In other cases, this different material may be a more rigid material than other portions of the housing in order to provide greater strength in the relatively thinner strain concentration portion 102 and/or prevent stress fatigue from damaging the strain concentration portion when the housing 101 is deformed. In one example of such a case, the different material may be an hard plastic and the other portions of the housing 101 may be an elastomer. In another example of such a case, the different material may be a metal and the other portions of the housing may be a plastic.

Figure 1F:
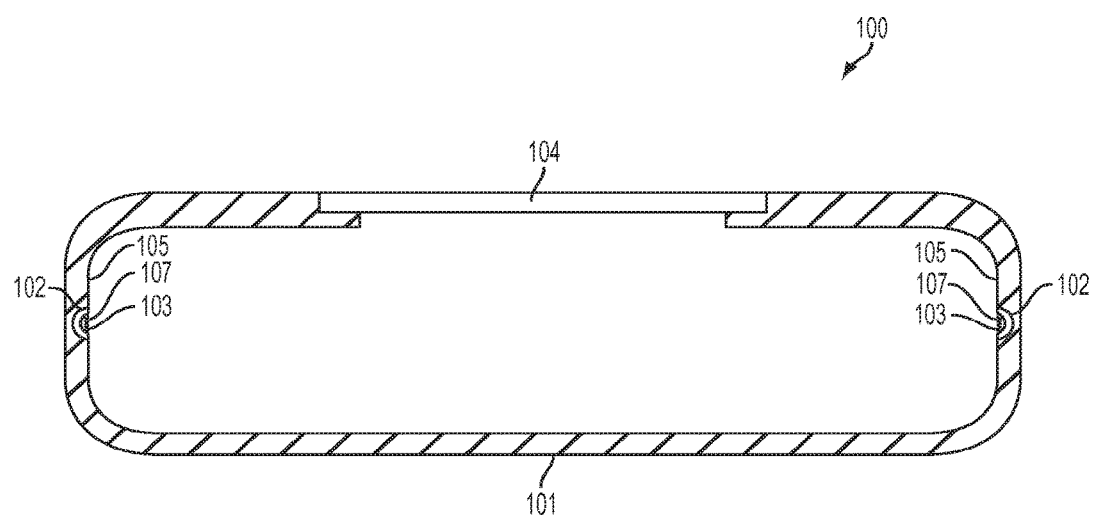
FIG. 1F is a cross-sectional front side view of a third implementation of the electronic device of FIG. 1A taken along the line 1A-1A of FIG. 1A.

FIG. 1F is a cross-sectional front side view of a third implementation of the electronic device of FIG. 1A taken along the line 1A-1A of FIG. 1A. As illustrated, structures 107 are positioned in the strain concentrating portions 102 that are operable to assist un-deformation of the housing after an applied force has deformed the housing and then is no longer applied. Such a deformation may operate to narrow the strain concentrating portions and the structures may operate to widen the strain concentrating portions again. As illustrated, the structures are springs. However, it is understood that this is an example and in various implementations the structures may be any structure operable to assist un-deformation of the housing after an applied force has deformed the housing and then is no longer applied.

Further, as illustrated, the structures 107 are separate from the sensors 103. However, it is understood that this is an example. In various implementations, the sensors and the structures may be the same component, such as a spring that senses the strain based on the amount that the spring is compressed when the housing 101 is deformed by the application of a force and then operates to un-compress when the force is removed and assist in un-deforming the deformed portion of the housing.

Figure 2:
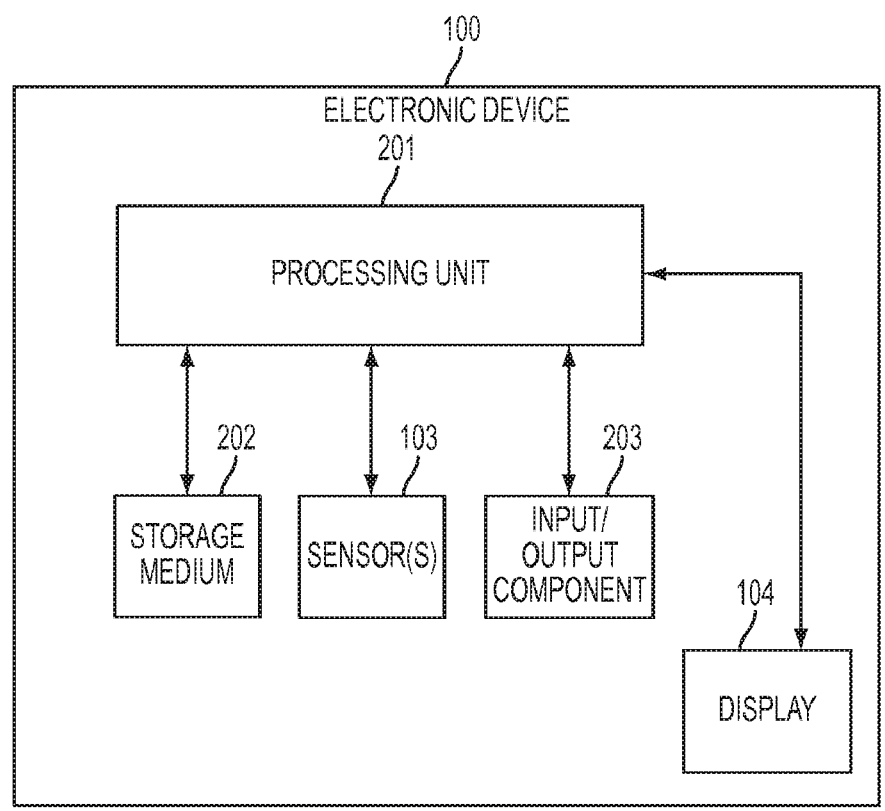
FIG. 2 is a block diagram of functional components that may be utilized in the electronic device of FIGS. 1A-1F.

FIG. 2 is a block diagram of functional components that may be utilized in the electronic device 100 of FIGS. 1A-1F. As illustrated, the electronic device may include one or more processing units 201, one or more non-transitory storage media 202 (which may take the form of, but is not limited to, a magnetic storage medium; optical storage medium; magneto-optical storage medium; read only memory; random access memory; erasable programmable memory; flash memory; and so on), one or more sensors 103, one or more input/output components 203, and/or one or more displays 104. The processing unit may be operable to execute instructions stored in the storage medium to perform various electronic device functions.

In some cases, such a function may include receiving data regarding strain caused by deformation of the housing 101 of the electronic device 100 sensed by the sensors 103 and/or process such data to determine one or more user inputs. From the received data the processing unit 201 may determine an amount of the force that was applied and/or a location on the electronic device and/or the housing where the force was applied. Additionally, in some cases the processing unit may process the data to determine the location where the force was applied and compare it to a previously determine location where a previous force was applied in order to determine a movement between the two locations. Moreover, in various cases the processing unit may receive data regarding the strain from multiple sensors and may compare the received data from the various sensors (such as determining the ratios between various detected strains) to determine the amount the applied force, the location where the force was applied, torque applied to the housing, and/or other such information regarding force applied to the housing.

For example, the processing unit 201 may process received data and determine that a user applied a force to an area on a side of the electronic device 100 associated with waking the electronic device out of a "sleep mode." As such, the processing unit may determine that user input corresponding to a command to wake the electronic device out of the sleep mode has been received and adjust a state of the electronic device accordingly.

In another example, the processing unit 201 may process received data and determine that a user applied a force to a location corresponding to an icon being displayed on the display 104. In this example, a lesser amount of force may be associated with selection of an icon whereas a greater amount of force may be associated with launching an application corresponding to the icon. The processing unit may determine based on processing the data that the user applied the greater amount of force and that user input corresponding to a command to launch the application has been received. As such, the processing unit may launch the application corresponding to the icon accordingly.

In a third example, the processing unit 201 may process received data and determine that a user applied a force to a location on the side of the electronic device 100. Previously, the processing unit may have processed previously received data to determine that the user had applied a previous force to a previous location on the side of the electronic device. The processing unit may analyze the data and the previously received data to determine that the user did not cease applying force between applying the force to the location and the previous force to the previous location. As such, the processing unit may determine that the user touched the previous location and then moved (or slid), while still applying force, to apply force at the location. In this example, applying force moving from the previous location to the location may be associated with increasing volume of audio presented by the electronic device. As such, the processing unit may determine that user input corresponding to a command to increase volume has been received and may increase volume accordingly.

In a fourth example, the processing unit 201 may be playing a video file via the display 104. The processing unit may process received data and determine that the user applied a force to a location on the back of the electronic device (the surface opposite the display 104, not shown in FIG. 1A) associated with pausing the video. As such, the processing unit may determine that user input corresponding to a command to pause the video has been received and pause the video accordingly. Subsequently, the processing unit may process received data and determine that the user applied a force to a different location on the back of the electronic device associated with resuming play of the video. As such, the processing unit may determine that user input corresponding to a command to resume play of the video has been received and resume play of the video accordingly.

In a fifth example, the processing unit 201 may be presenting a motorcycle driving game via the display 104. The processing unit may process received data and determine that the user applied a force to bend the electronic device 100. In this case, bending the electronic device may be associated with increasing the speed on the motorcycle in the game. As such, the processing unit may determine that user input corresponding to increasing the speed of the motorcycle in the game has been received and alter the game accordingly. Subsequently, the processing unit may process received data and determine that the user applied a force to twist the electronic device. In this case, bending the electronic device may be associated with braking the motorcycle in the game. As such, the processing unit may determine that user input corresponding to braking the motorcycle in the game has been received and alter the game accordingly.

Figure 3:
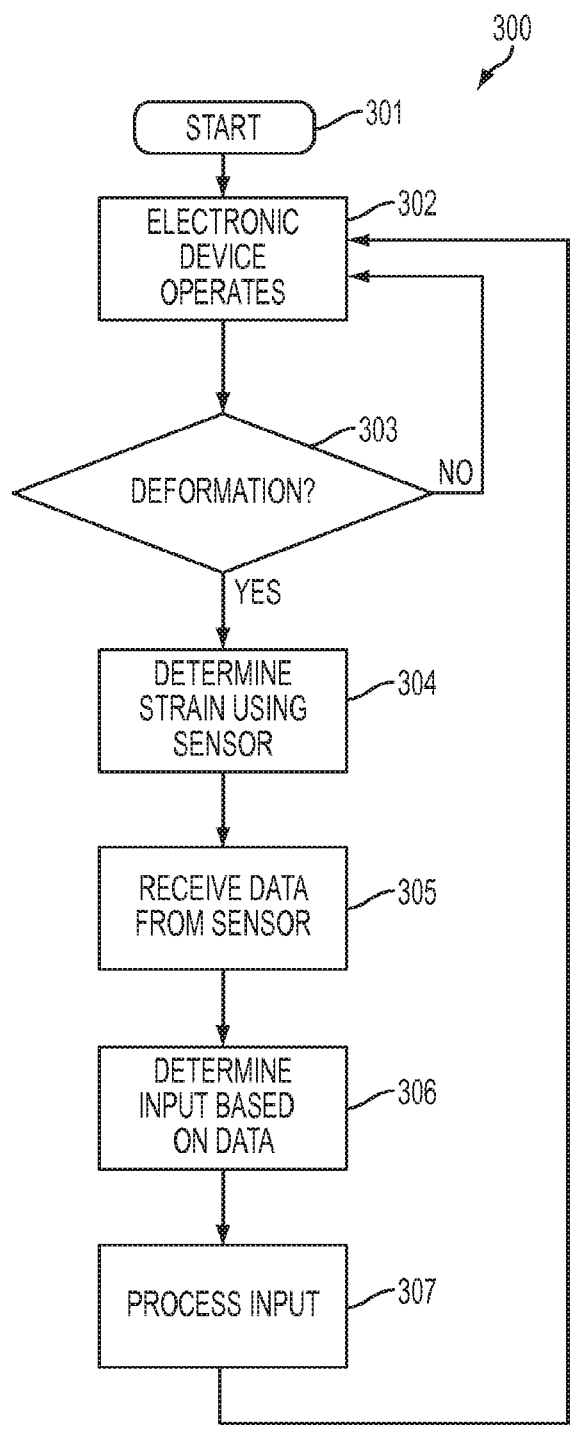
FIG. 3 is a flow chart illustrating a method for operating an electronic device. This method may be performed by the electronic device of FIGS. 1A-2.

FIG. 3 is a flow chart illustrating a method for operating an electronic device. This method may be performed by the electronic device of FIGS. 1A-2. The flow begins at block 301 and proceeds to block 302 where the electronic device operates.

The flow then proceeds to block 303. At block 303, if a housing of the electronic device is deformed, the flow proceeds to block 304. Otherwise, the flow returns to block 302 where the electronic device operates.

At block 304, after the housing of the electronic device is deformed, a sensor positioned on at least one strain concentration portion of a wall of the housing where the strain is greater than at other portions of the housing senses strain caused by the deformation. The flow then proceeds to block 305 where at least one processing unit of the electronic device receives data regarding the strain from the sensor.

Next, the flow proceeds to block 306 where the processing unit determines a user input based on the data. The flow then proceeds to block 307 where the processing unit processes the user input.

Finally, the flow returns to block 302 where the electronic device continues to operate.

As discussed above, the present disclosure discloses apparatuses and methods for force sensing compliant enclosures for electronic devices. A force sensing compliant enclosure for an electronic device may include at least one deformable housing wall. At least one strain concentration portion may be located on the deformable housing wall where strain caused by application of a force that deforms the deformable housing wall is greater than at other portions of the deformable housing wall. One or more sensors may be positioned in the strain concentration portion and may sense strain caused by the application of the force that deforms the deformable housing wall. In this way, the strain caused by the deformation of the deformable housing wall may be concentrated at the location sensed by the sensor.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented. It should be appreciated that any of the inputs, gestures, touches, applications of force and the like described herein with respect to various examples may be broadly used as inputs to an electronic device incorporating a force-sensing compliant enclosure. Thus, a sensed force applied to a side, back, or front surface of a device (or other region) may be used and interpreted as any suitable input, as may sliding, tapping, or other gestural inputs and associated forces.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM);

erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. An electronic device, comprising:
a housing, comprising:
an internal wall surface forming a part of an interior perimeter of the housing;
at least one strain concentration portion located on the internal wall surface wherein:
the at least one strain concentration portion experiences a strain caused by application of a force that deforms the internal wall surface;
the strain experienced by the at least one strain concentration portion is greater than strain experienced by other portions of the internal wall surface; and
the at least one strain concentration portion includes an indentation defined by the internal wall surface wherein the indentation is thinnest at a middle of the indentation; and
at least one sensor positioned at the at least one strain concentration portion that senses the strain caused by the application of the force that deforms the internal wall surface.

2. The electronic device of claim 1, wherein the internal wall surface has a first thickness at the at least one strain concentration portion and a second thickness at the other portions of the internal wall surface wherein the first thickness is less than the second thickness.

3. The electronic device of claim 1, wherein the sensor comprises at least one strain gauge, at least one capacitive sensor, at least one parallel plate capacitive sensor, or at least one piezoelectric sensor.

4. The electronic device of claim 1, wherein the at least one sensor comprises a plurality of sensors.

5. The electronic device of claim 4, further comprising at least one processing unit configured to receive data regarding the strain sensed by each of the plurality of sensors.

6. The electronic device of claim 5, wherein the at least one processing unit is configured to compare the data received from each of the plurality of sensors to determine a location on the housing where the force was applied.

7. The electronic device of claim 6, wherein the at least one processing unit is configured to compare the determined location with a previously determined location where a previous force was applied to determine at least one movement between the determined location and the previously determined location.

8. The electronic device of claim 5, wherein the at least one processing unit is configured to compare the data received from each of the plurality of sensors to determine an amount of the force.

9. The electronic device of claim 1, wherein the at least one strain concentration portion is located on a middle portion of the internal wall surface.

10. The electronic device of claim 1, wherein the indentation is curved.

11. The electronic device of claim 1, wherein the at least one sensor comprises a plurality of sensors and the at least one strain concentration portion comprises a plurality of strain concentration portions that each include at least one of the plurality of sensors.

12. The electronic device of claim 1, wherein the housing comprises a plurality of joined internal wall surfaces and the at least one strain concentration portion extends across multiple of the plurality of joined internal wall surfaces.

13. The electronic device of claim 12, wherein the plurality of joined internal wall surfaces form the interior perimeter of the housing and the at least one strain concentration portion extends around the interior perimeter.

14. The electronic device of claim 1, wherein the at least one sensor is positioned at a portion of the at least one strain concentration portion wherein strain caused by the application of the force is greater at the portion of the at least one strain concentration portion than at other portions of the at least one strain concentration portion.

15. The electronic device of claim 1, wherein the at least one sensor is aligned with a direction of the wherein strain caused by the application of the force.

16. The electronic device of claim 1, wherein the housing comprises at least a first material and a second material wherein the at least one strain concentration portion is located on the second material.

17. The electronic device of claim 16, wherein the second material is more deformable than the first material.

18. The electronic device of claim 1, wherein the electronic device comprises a handheld electronic device.

19. A housing for an electronic device, comprising:
an internal wall surface that forms a part of an interior perimeter of the housing;
at least one strain concentration portion located on the internal wall surface comprising a groove that is thinnest at a middle of the groove; wherein:
the at least one strain concentration portion experiences a strain caused by application of a force that deforms the internal wall surface;
the strain experienced by the at least one strain concentration portion is greater than strain experienced by other portions of the internal wall surface; and
the portion of the internal wall surface where the at least one strain concentration portion is located is made of a different material having a different rigidity than a material forming other portions of the internal wall surface; and
at least one sensor positioned at the at least one strain concentration portion that senses the strain caused by the application of the force that deforms the internal wall surface.

20. A portable electronic device, comprising:
a housing having an internal wall surface that forms a part of an interior perimeter of the housing;

a strain concentration portion defined as a notch in the internal wall surface wherein the notch is thinnest at a middle of the notch;
a force sensor positioned at the middle of the notch; and
a processor configured to receive an indication of a force that deforms the housing from the force sensor.

* * * * *